United States Patent [19]

Anderson

[11] 4,290,310

[45] Sep. 22, 1981

[54] ULTRASONIC IMAGING SYSTEM USING DIGITAL CONTROL

[75] Inventor: Weston A. Anderson, Palo Alto, Calif.

[73] Assignee: Varian Associates, Inc., Palo Alto, Calif.

[21] Appl. No.: 55,721

[22] Filed: Jul. 9, 1979

[51] Int. Cl.³ ............................................. G01N 29/04
[52] U.S. Cl. ................................................. 73/626
[58] Field of Search .......................... 73/626; 128/660; 367/105

[56] References Cited

U.S. PATENT DOCUMENTS

| | | | |
|---|---|---|---|
| 3,285,059 | 11/1966 | Bogle | 73/626 |
| 3,555,889 | 1/1971 | Weighart | 73/626 |
| 4,005,382 | 1/1977 | Beaver | 73/626 |
| 4,159,462 | 6/1979 | Rucha et al. | 73/626 |
| 4,174,705 | 11/1979 | Buchner | 128/660 |

Primary Examiner—Anthony V. Ciarlante
Attorney, Agent, or Firm—Stanley Z. Cole; Peter J. Sgarbossa

[57] ABSTRACT

A real-time ultrasonic imaging system is disclosed which includes an array of transducers adapted for propagating ultrasonic energy into a body to be ultrasonically examined and for receiving reradiated energy from points within the body. A plurality of signal channels each includes a transmitter branch and a receiver branch associated with respective transmit and receive transducers, or both branches may share a single transducer. A transmitter branch activates a transducer to propagate the sonic energy and a receiver branch receives from the transducer electrical signals corresponding to the reradiated energy. Memory means in each receiver branch receive and store data indicative of the signal level passed to the channel by its associated transducer. Display means are provided for receiving the data from the memory means in each of the channels and for combining and processing such data to effect a real-time display of the bodily portion being examined. Timing generator means in each of channels, connected to the transmitter and memory means associated with that channel, activate the respective transducers at predetermined times to phase the transducers to enable steering and focusing of the array. The timing generator means also function to gate data into the memory and at a later time to gate out the data from the memory (at predetermined intervals), thereby controlling the bodily points from which the reradiated sonic energy is received and to enable steering and focusing of the transducer array during the receiving operation of such array. Control logic means are connected to the timing generator means for enabling the former to provide signals to the memory means and transmitters in each of the said channels.

17 Claims, 5 Drawing Figures

ULTRASONIC IMAGING SYSTEM USING DIGITAL CONTROL

DESCRIPTION

BACKGROUND OF THE INVENTION

This invention relates generally to apparatus and methodology for effecting medical diagnosis and, more specifically, relates to systems and methodology utilizing ultrasonic techniques for such purposes.

Over the course of the last two to three decades, ultrasonic technology has played an ever-increasing role in medical diagnostics. Such techniques find applications in diagnosis of various medical aliments wherein it is useful to examine internal bodily organs with the objective of locating features or aspects of such organs which may be indicative of disease, abnormalities or so forth.

While early systems of the foregoing type included very limited capabilities and display functions, there has more recently come into use highly sophisticated devices which are capable of providing real time images or recorded displays with excellant detail and good resolution of desired portions of the bodily organs being examined. In a typical such device the transducer utilized with the system comprises a phased array consisting of a plurality of transducer elements arranged in a compact linear array. Each transducer element is connected to a suitable transmitter and receiver and the transmitted pulses are so phased as to steer and focus the emitted sound beam in the desired direction. Adjustable delays provided in each receiver channel enhance the reception at the desired depth and from the same direction as the transmitted sound beam. By suitably controlling the timing of the voltages applied to the transducer elements, and by controlling the adjustable delays of the separate receiver channels, the beam can be steered to any desired angle of a fan-shaped sector and focused to any desired depth. Operation of the steered array is such that a plurality of radial lines defining the fan-shaped sector are successively generated with a relatively high number of such radial lines, typically of the order of 128 such lines, being utilized in the course of generating the entire sector.

The set of such lines are generated over a short period, typically of the order of 1/30 of a second, whereby the corresponding display on the system cathode ray tube (CRT) is a high resolution substantially real time image of the body organ portions being examined. The said visualization is—in the terminology of the present art—a so-called B-mode scan, i.e., one wherein variations of the acoustical impedance of the tissue are translated into brightness variations on the CRT screen.

Details regarding the prior art signal processing techniques utilized in apparatus of the foregoing type in order to generate the mentioned fan-shaped sector image are set forth in a number of points in the prior art. Reference may usefully be had, for example, to U.S. Pat. No. 4,005,382 to William L. Beaver entitled "Signal Processor for Ultrasonic Imaging", which patent is assigned to the assignee of the present application.

Consideration of the prior art systems as above set forth will establish that the delay mechanism usually employed in order to effect steering and focusing of the received signals was based upon use of delay lines, with various types of switching mechanisms being utilized in order to enable selective switching among the said delay lines. Such an approach, while reasonably effective for the purposes of interest, nonetheless suffers from a number of important disadvantages. These include the high cost of delay lines—especially in that the time-bandwidth product pursuant to which delay lines are evaluated and to which the cost of delay lines are accordingly correlated, is a relatively high factor in systems of this type. In particular for large aperture systems required to obtain extremely high resolution these prior systems require delay lines with long delay times in consequence of which the said time-bandwidth product was necessarily quite high.

Further, in view among other things of the aforementioned fact that for large aperture systems the data must necessarily progress through a number of such delay line elements, there is a consequent requirement for a considerable number of such delay line elements, with consequent increased circuit complexity.

In accordance with the foregoing, it may be regarded as an object of the present invention to provide an ultrasonic imaging system which utilizes a digital control and memory means for both steering and focusing of the transmitter and receiver portions of this system, and which thereby eliminates use of the aforementioned delay lines and the problems incident to utilization of same.

It is a further object of the present invention to provide an ultrasonic imaging system of the indicated character wherein the same digitally controlled delay means is used for generating transmitter and receiving timing signals, thereby permitting a simpler and less costly system.

It is a further object of the present invention to provide an ultrasonic imaging system of the aforementioned character which by virtue of the digital control features thereof may be constructed with standard commercially available parts and with a great deal of flexibility in the elements, such as the memory means, which are incorporated therein.

SUMMARY OF INVENTION

Now in accordance with the present invention, an ultrasonic imaging system is disclosed which includes an array of transducers adapted for propagating ultrasonic energy into a body to be ultrasonically examined and for receiving reradiated sonic energy from points within the body. The array cooperates with a plurality of signal channels including transmitter branches and receiver branches. The transmitter branches activate transducers to propagate sonic energy; the receiver branches receive electrical signals from transducers corresponding to the reradiated energy. A plurality of identical digital memory means each including, for example, a charged coupled device (CCD), or first-in first-out memory (FIFO), clocked serial analog memory (SAM), or random access memory (RAM), are provided in each of the said receiver branches for receiving and storing data indicative of the signal level of the reradiated energy received by said receiver branch.

Display means receive the data from the memory means in each of the aforementioned channels and combine and process the data to effect a display of the bodily portion being examined.

Timing generator means in each channel are connected to the transmitter branch and memory means associated with that channel for activating the transducers at predetermined times to phase the transducers to enable steering and focusing of the array; and further for gating in the said data to the memory at times which are delayed with respect to activation of the transducers by predetermined intervals thereby controlling the bodily points from which the reradiated sonic energy is received, and gating out the said data from memory at times which are delayed with respect to the gating in times whereby enabling steering and focusing of the transducer array during the receiving function. Control logic means are connected to the timing generator means for enabling the signals to the memory means and to the transmitter branches in each of the channels.

In one embodiment of the invention the memory means may comprise a serial analog memory (SAM). In this hybrid type of device, the analog input signal proceeding in the aforementioned receiver branch of a given channel is time sampled and a plurality (e.g., 64) of such samples may be stored on a first-in, first-out basis. The timing generator means, which can comprise a read-only memory (ROM) in association with a preset counter, activates the transmitter as aforesaid and then provides properly related timing signals to the SAM in order to enable its reading in of signal data at appropriate delay with respect to activation of the transducer, and its readout at an appropriate later time to effect an appropriate delay at the received signal.

In another embodiment of the invention, the memory means can comprise a charge coupled device (CCD) memory. The timing generator means provides controlled clocking signals to the CCD memory, whereby the analog signal proceeding in the receiver branch of a given channel is again time-sampled and a plurality of such samples are stored in the CCD memory for a selected, predetermined time period. The delay period thus introduced by the CCD may be controlled by sequentially clocking the CCD at two different frequencies such that after the number of clock pulses required to transfer a signal through the CCD the entire pulse sequence repeats. Thus every analog bit that enters the CCD experiences the same total delay as every other such bit, with the delay depending upon the relative number of clock pulses at the respective two frequencies.

In yet another embodiment of the invention, the memory means can comprise a first-in, first-out memory (FIFO), with the analog signal inputs from the channel being provided to a FIFO by a means of an analog-to-digital converter (ADC). A read-only memory (ROM) and associated counter and gating means may be utilized again in this embodiment for activating the transducers in each channel and for timing read-in and read-out from the FIFO's.

BRIEF DESCRIPTION OF DRAWINGS

The invention is diagrammatically illustrated, by way of example, in the drawings appended hereto, in which.

DESCRIPTION OF PREFERRED EMBODIMENT

Figure 1:
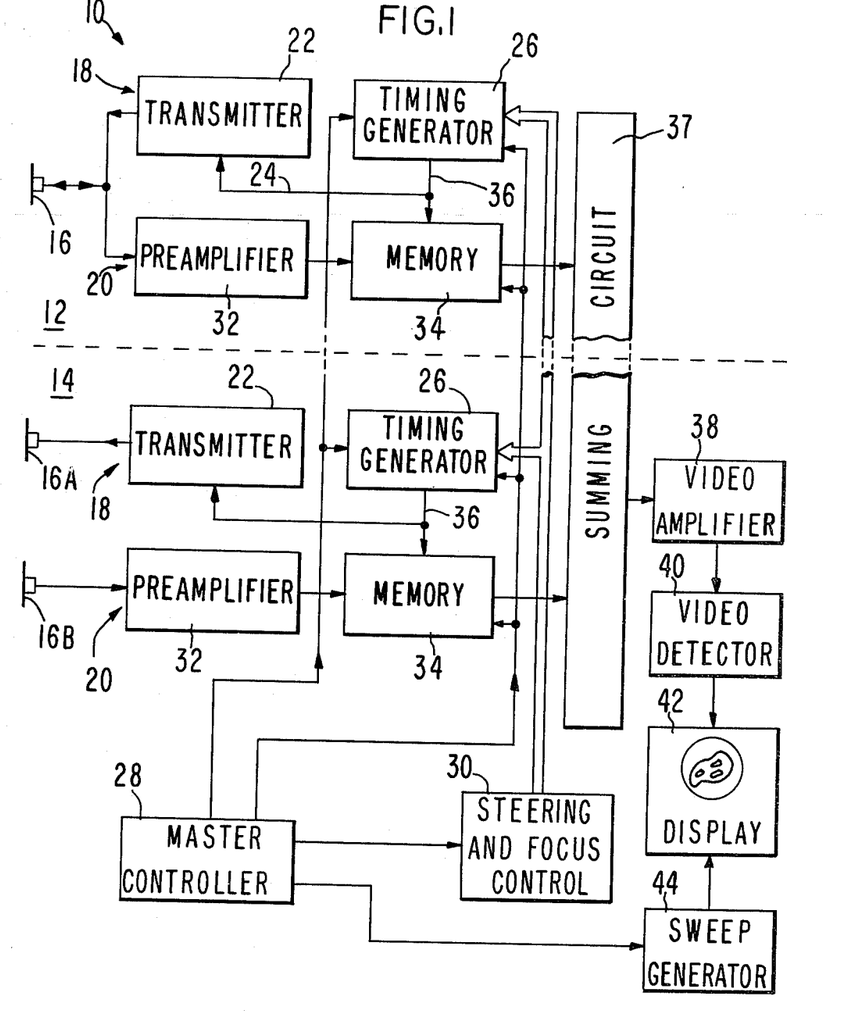
FIG. 1 is a schematic block diagram illustrating an ultrasonic imaging system in accordance with the principles of the present invention.

In FIG. 1 herein a simplified block diagram is set forth illustrating operation of an ultrasonic imaging system 10 in accordance with the principles of the invention.

The imaging system 10 operates upon ultrasonic principles and is intended primarily for use in effecting diagnosis of bodily systems and organs, i.e., for medical purposes, although it will be evident to those skilled in the present art that the said system is useful in other applications such as for non-destructive evaluation of mechanical parts and materials.

A pair of transducer channels 12 and 14 are illustrated in FIG. 1. Each channel includes a transmitter branch 18 and a receiver branch 20, connected either to a single transmit/receive transducer 16, as illustrated for channel 12, or alternatively, to a transmit transducer 16A and a receive transducer 16B, respectively, as illustrated for channel 14. The two channels 12 and 14 form but part of a plurality of such channels—in a typical system, 32 or more such channels may actually be present. All the channels normally are identical, and the system 10 will normally include only one of the alternative transducer arrangements shown in connection with channels 12 and 14.

Although various transducer configurations are known to be useful in conjunction with generation of two-dimensional images and can be used with the invention, transducers 16 preferably are part of a phased array consisting, for example, of a plurality of such elements 16, as, for example, 32 such elements arranged in a compact linear arrangement.

Referring to a single such channel 12, a transmitter 22 is periodically activated through control line 24 via the timing generator means 26. The latter in turn is activated by master controller 28 which includes overall control and logic for the present system, via steering and focus control means 30. Elements 28 and 30 are, of course, similarly connected to corresponding elements in each of the plural channels. The transmitters such as 22 are thus activated to emit pulses at the desired ultrasonic frequency. The activation and resultant generation of the said pulses is thus phased by the timing sequence of the voltages applied to the individual transducers 16, as to steer the emitted sound beam in the desired direction.

Sonic energy is then reflected from various portions of the body or organ system which it is desired to examine. These reflected pulses are detected by transducer 16 and the resulting analog signal passed through receiver branch 20, where it is amplified at preamplifier 32, and thence passed to memory means 34. Memory means 34 effectively serves as a buffer or storage element wherein the signals proceeding in the receiver branch 20 may, by appropriate reading in and reading out from the memory, be delayed for desired periods with respect to the transmitted pulse, the echo reflections of which are being considered by the system. Thus, it will be seen that the aforementioned timing generator 26 also provides timing signals via line 36 to memory means 34. These timing signals control the read-in and read-out of information flowing to memory means 34 in the receiver branch 20. By suitable adjustment of these timing signals consequent to adjustable delays are enabled in the several receiver channels, whereby the array of transducers is so phased that steering and focusing on an area of interest in the body being examined is enabled during the display process.

The outputs from the memory means 34 in each of the channels 12, 14, etc. are provided to a summing circuit 37, the summed output of which proceeds to a video amplifier 38, a video detector 40, and thence is provided to display means 42. The aforementioned master controller 28 provides signals to sweep generator 44 in order to synchronize development of the video display with the modulating signal proceeding from the summing circuit 37. In a typical display a plurality of radial lines defining a fan-shaped sector are successively generated at the display, with a relatively high number of such radial lines, typically in the range of 64 to 256 being utilized in the course of generating the entire sector.

Further details regarding signal processing techniques utilized in connection with the transducer array to generate the mentioned fan-shaped sector are set forth in the aforementioned U.S. Pat. No. 4,005,382.

Figures 2, 4:
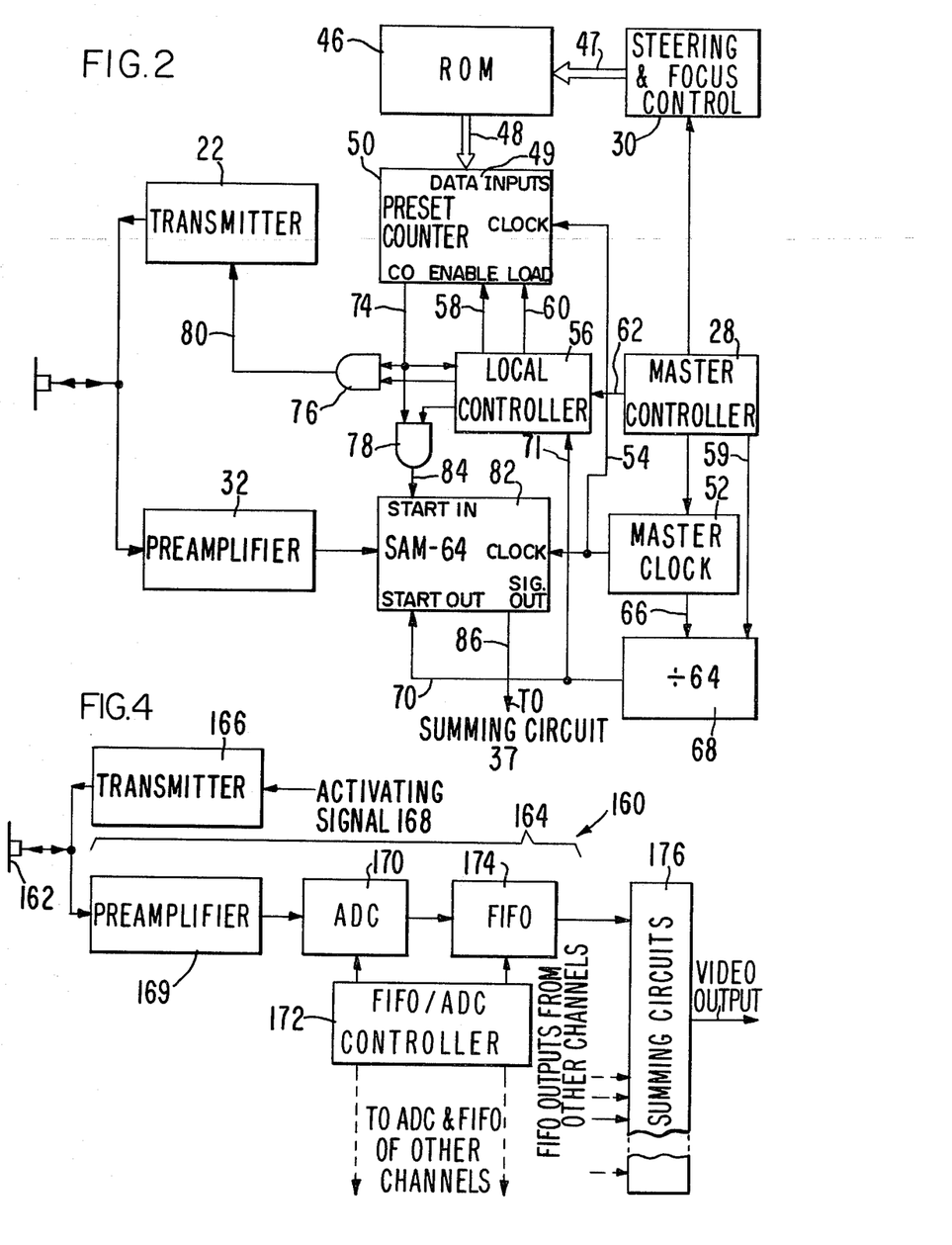
FIG. 2 is an electrical block diagram, schematic in nature, illustrating for a first embodiment of the invention the principal elements present in one of the channels appearing in FIG. 1.
FIG. 4 is a simplified block diagram, again schematic in nature, illustrating a further system in accordance with the principles of the invention.

FIG. 2 herein sets forth in greater detail a first embodiment of the invention, the present figure being directed to and illustrating one of the channels, such as channel 12 in the system of FIG. 1.

Pursuant to the invention and operating under the control of master controller 28, a steering and focusing word is provided from steering and focus control 30 to the ROM 46 via line 47 which may be a multiconductor cable. Typically, the steering and focusing word can, for example, be made up of ten binary bits, seven of which represent the steering direction for the transducer array and three of which represent the depth of focus. The ROM converts this bit pattern into one that can be more directly interpreted by the transmitter and receiver control circuits. In particular the output lines 48 from ROM 46 are coupled to the preset data input terminals 49 of a preset counter 50. The latter can, for example, be a six-bit counter requiring six preset bits via line 48.

A master clock 52 provides clocking pulses to all portions of the system requiring same, including to the preset counter 50 via line 54. Counter 50 counts these pulses; counter 50 is controlled by local controller 56 which is seen to provide controls via lines 58 and 60 to the enable and the load controls of counter 50.

Upon command from master controller 28 provided via line 62 to local controller 56, the bit pattern from ROM 46 is loaded into the preset inputs 49 of counter 50. More specifically, this is achieved by a command on line 60. Immediately thereafter local controller 56 activates line 58 enabling counter 50 to start counting upward from the original value set by the preset value. Upon counter 50 reaching the maximum count, a pulse appears on the carry output (CO) line 74 which is coupled to local controller 56 and to the two AND gates 76 and 78. The first CO pulse is used to control the activation of transmitter 22, i.e., by the AND gate 76 output in line 80. The second and subsequent pulses are blocked from transmitter 22 by means of AND gate 76 and instead are coupled to the receiver delay means via AND gate 78.

As aforementioned, the delay means in the present invention constitutes a memory means which in the instant embodiment takes the form of a serial analog memory 82, i.e., a so-called SAM.

The SAM above mentioned, i.e., serial analog memory, is a member of class of solid state devices which functions to time-sample an analog input signal and provide first-in, first-out storage for a particular number of samples, in the present instance for 64 such samples. The memory 82 may, for example, be the SAM 64 device available from Reticon Corporation of Sunnyvale, Calif.

The receiver delay time which may be effected by the technique described is equal to the time difference between the start-in pulse provided via AND gate 78 via line 84 to the SAM 82, and the start-out pulse which is provided to the SAM 82, via the line 70. This time difference is thus determined by the time required to achieve a full 64 count of counter 68 after activation by the enable signal via line 59 from master controller 28 and the time required to achieve a full count on preset counter 50. This time difference is thus controlled in consequence of the values set on data inputs 48 from ROM 46, which in turn (as aforementioned) is a function of the desired steering angle and focus depth which is instructed from steering and focus control 30. Thus, it will be clear that this same mechanism is used to properly delay activation of transmitter 22 to achieve the same steering angle and focus depth. The suitably delayed output from SAM 82 is thus enabled on signal output line 86 and is provided to summing circuit 37 for the purposes previously discussed.

Figure 3:
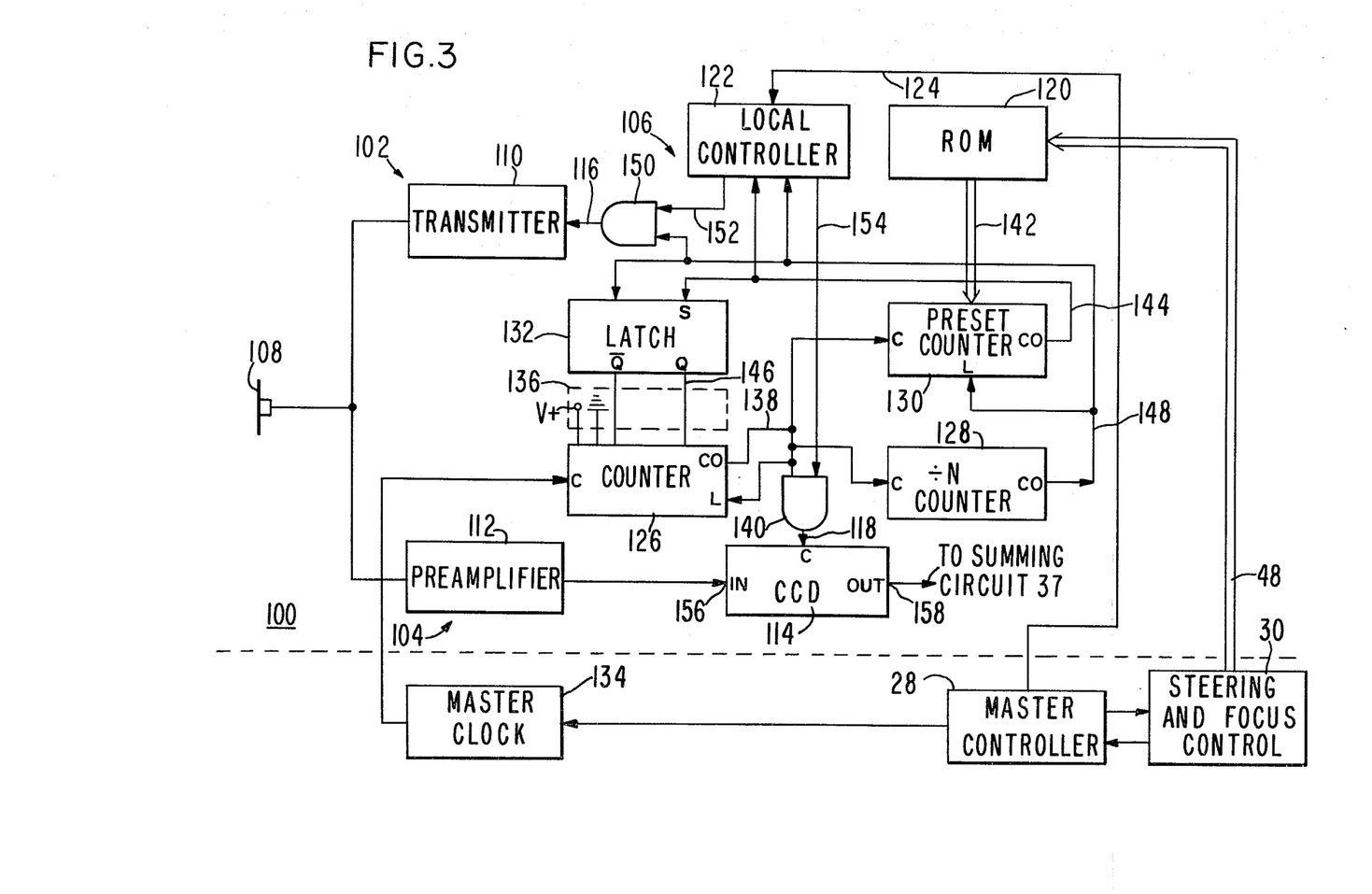
FIG. 3 is an electrical block diagram, schematic in nature, illustrating the principal elements present in a second embodiment of the invention.

In FIG. 3 herein a schematic block diagram appears of a further embodiment of the present invention. In this embodiment the receiver signals are stored in a CCD (charged-coupled device) memory.

Referring to FIG. 3, a signal channel 100 is shown, with a transmitting branch 102, receiving branch 104, and timing generator means 106. The transducer 108 is coupled to transmitter 110 and preamplifier 112 as discussed in connection with FIGS. 1 and 2. The output of preamplifier 112 is coupled to memory means 114 which, in this embodiment, is a CCD memory which may be, for example, a type CCD 321, bit analog shift register manufactured by Fairchild Camera and Instrument Corporation, Mountain View, Calif. Timing generator means 106 is used to control the signal delay time in CCD memory 114 and to control the activation of transmitter 110 to thereby provide steering and focusing of channel 100 in accordance with master controller 28 and steering and focusing control 30. Timing generator means 106 supplies appropriately timed signals on line 116 to activate transmitter 110 and supplies a train of clock pulses to CCD memory 114 via line 118. Master clock 134, master controller 28, and steering and focus control 30, provide identical clock and control signals to all channels including channel 100. For example, a phased array ultrasound imaging system may contain a total of 16 or 32 channels as discussed in connection with FIG. 1.

Operating under the control of master controller 28, a steering and focusing word is provided from steering and focus control 30 to the ROM 120 via line 48. Local controller 122 is initialized by master controller 28 via line 124. As a first step in a sequence of operations, local controller 122 initializes counters 126, 128, 130 and latch 132 (connections not shown). In this initial state the $\overline{Q}$ output of latch 180 is true and the Q output is false. Signals from master clock 134 are coupled to the clock input of counter 126. This counter divides the clock input frequency by a value M or M' depending upon the state of latch 132. The Q and $\overline{Q}$ outputs of latch 132 are appropriately coupled to the appropriate preset input lines 136 of counter 126. Other preset input lines may be appropriately connected to either a positive voltage or ground depending upon the desired divisors M or M'. In a typical example, master clock 134 may generate a frequency of 60 MHz and counter 126 may be initially set by latch 132 and the preset input lines 136 to enable counter 126 to divide by M=3, thereby causing an output frequency on line 138 of 20 MHz. This output frequency is coupled to the clock inputs of counters 128 and 130, and may also be coupled to the clock input of CCD memory 114 through AND gate 140.

Counter 130 starts counting from a value determined by the preset input number that is supplied by ROM 120 via line 142. When the counter 130 reaches its maximum value, a signal appears on the CO (carry out) line 144 which sets latch 132 causing the Q output to become true, thereby producing a positive voltage on the Q output line 146. The change of the logic levels Q and $\overline{Q}$ supplied via preset inputs 136 to counter 126 changes the divisor of counter 126 to a new value M', a typical value may be M'=4, thereby causing output frequency on line 138 of 15 MHz. This new frequency on line 138 is supplied to counters 126, 128 and 130. Any additional output signals from counter 130 via line 144 will have no further effect since latch 132 has already been set.

When counter 128 reaches its maximum count, a carryout signal appears on line 148, which simultaneously resets latch 132 causing $\overline{Q}$ to again become true and the signal on line 148 also loads counter 130 with a new preset value from ROM 120. The first time the signal appears on line 148 after the initialization from local controller 122, the signal is coupled to transmitter 102 via AND gate 150. This gate is operated by a signal on line 152 from local controller 122. In all subsequent cycles the signal is not present on line 152 but a signal is present on line 154. The signal on line 154 permits AND gate 140 to couple the output frequency on line 138 to the CCD memory 114.

The time activation of transmitter 102 is thus determined by the two clock frequencies that appear on line 138 at the output of counter 126 and the value of the preset input on counter 130 (as well as the maximum count of counters 128 and 130). If the two clock frequencies on line 138 are f and f', n is the number of pulses required to fill counter 130 starting from the preset value entered from ROM 120 and N is the number of pulses that fill counter 128, then the total delay time λ between the initialization by local controller 122 and the output pulse on line 148 is given by $$\lambda = \frac{n}{f} + \frac{N-n}{f'}$$

In operation, counter 128 is made to have a total count N that is equal to the number of delay stages in CCD memory 114, i.e., N clock pulses must be applied to the clock input line 118 to shift a signal from the input terminal 156 to output terminal 158 of CCD memory 162. Since, as mentioned above, n is determined by the value at the output of ROM 120, one can vary the relative firing time of the transmitters and the total delay times of the signals passing through the CCD channels by increments of $|1/f - 1/f'|$. As mentioned above, typical value of f and f' are 15 and 20 MHz permitting delay increments of $16\frac{2}{3}$ nanoseconds in this example. The CCD memory 114 may be, for example, a Fairchild Type 321 analog shift register. This CCD has a maximum clock frequency of 20 MHz and consists of two 455-bit analog shift registers. Thus the maximum incremental delay that can be achieved in this example is equal to $455 \times 16\frac{2}{3}$ nanoseconds, or 7.583 microseconds. If greater incremental delay values are desired, two or more sections can be connected together to provide greater time delays.

It is noted that although the CCD memory is sequentially clocked at two different frequencies while an analog signal bit is passing through the memory, for a fixed value of n, each analog signal bit experiences the same number of pulses at each frequency, and thus experiences the same total time delay.

In FIG. 4 herein a schematic block diagram appears of a further embodiment of the present invention. In this embodiment the receiver signals stored in the memory means are rendered into digital form by an ADC and then furnished to a FIFO (first-in, first-out) memory.

Referring to FIG. 4, a signal channel 160 is again shown, which is associated with a transducer 162 as discussed in connection with FIGS. 1, 2 and 3. In the present instance, only the receiver branch 164 of the channel is shown in detail. Additionally, it will be appreciated that a plurality of channels such as 160 are actually present, each channel being associated with a transducer. In order, however, to simplify the presentation of the ensuing discussion, reference will primarily be made to the operations occurring in channel 160, since in each instance the operations of the several channels are identical.

Assuming therefore that transmitter 166 has initially been activated by a signal 168 to activate transducer 162 and thereby produce an ultrasonic pulse, the transducer detects the returning sonic energy from the body being examined, and the resultant electrical analog signal proceeds via receiver branch 164 through preamplifier 169.

At this point the signal proceeding from preamplifier 169 is digitized by ADC 170, the sampling rate of which is controlled by FIFO/ADC controller 172.

The output of ADC 170 is then provided into digital delay means consisting in the present embodiment of the invention of a FIFO (first-in, first-out) digital memory 174. Read-in and read-out from FIFO memory 174 is controlled by controller 172.

The suitably delayed signal read-out from FIFO 174 is then provided to a summing circuit 176 where it is combined with the signals from the receiver branches of the various other channels (which are similarly controlled by FIFO/ADC controller 172), and the resultant combined video output signal is utilized for display purposes as discussed in connection with FIGS. 1 and 2.

Figure 5:
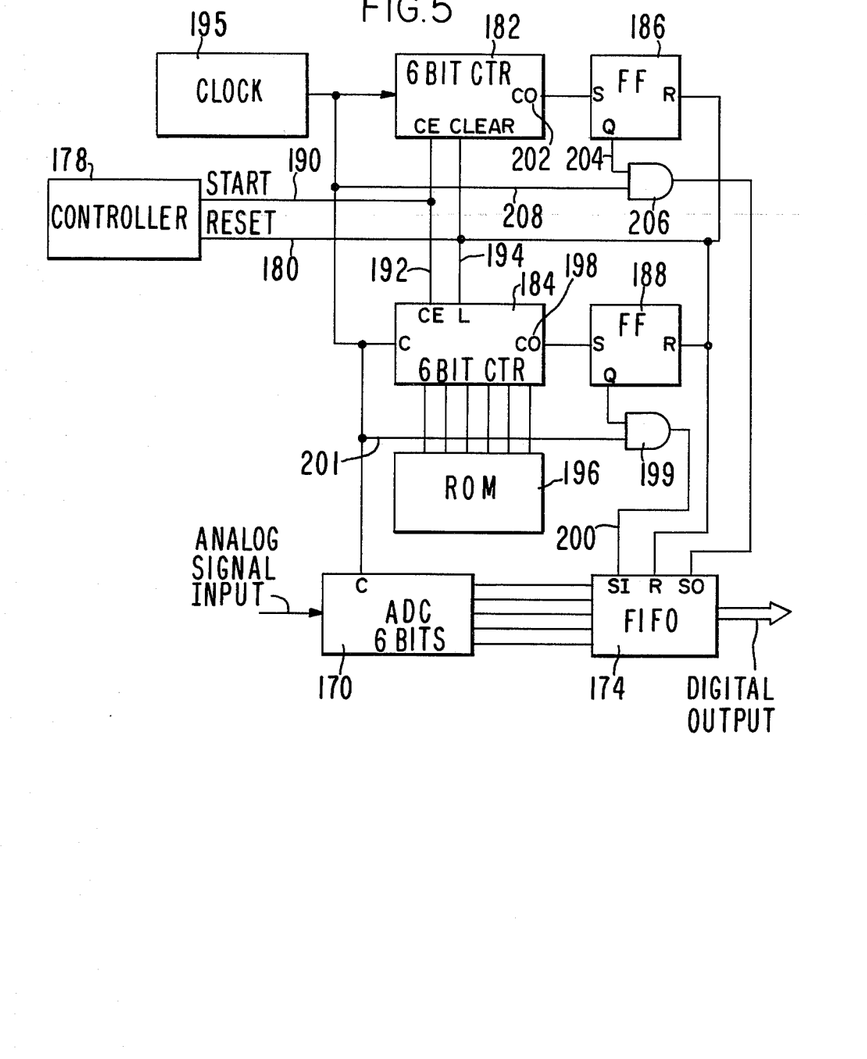
FIG. 5 is a further schematic block diagram illustrating details of one of the channels provided in the FIG. 4 embodiment.

In FIG. 5 herein, a schematic block diagram sets forth details of the manner in which the signal in receiver branch 164 of channel 160 is read into and out of the FIFO memory means 174.

Prior to activation of transducer 162 as aforementioned, controller 178 provides a reset pulse on line 180, which resets counters 182 and 184, as well as the FIFO 174 and the two flip flops 186 and 188. Thereafter, controller 178 provides a start pulse via line 190 which proceeds via line 192 and enables counters 182 and 184. This start pulse can also be used to fire transmitter 162 or timing of the firing pulse for the transmitter can be controlled by said start pulse.

Previously the reset pulse in line 180 has also been provided via line 194 to counter 184, which in consequence has been loaded with appropriate steering and focusing data from the ROM 196. Such data is provided to the preset inputs of counter 184, which is a preset counter. Clock pulses are provided from a clock 195 to each counter 182 and 184. Upon the count in counter 184 reaching its maximum, a pulse appears on CO output 198 and is provided to flip-flop 188. The Q output of flip-flop 188 is activated by the pulse from counter 184 and enables AND gate 199. AND gate 199, which is also receiving clock pulses from clock 195 via line 201, upon activation transmits the clock pulses via line 200 to the start-in (SI) input of FIFO 174. These start-in pulses permit read-in of the digitized data from ADC 170 to FIFO 174.

The remaining counter 182, upon reaching its maximum count, provides a pulse in CO output 202, which enables an output on line 204 of flip-flop 186. This enables AND gate 206 which is receiving clock pulses from clock 195 via line 208. The resulting clocked output from AND gate 206 enables the FIFO 174 to start clocking pulses out of its memory. The resultant digital output is thereby suitably delayed by virtue of the difference in time between occurrence of the start-in and start-out signals to the FIFO.

While the present invention has been particularly set forth in terms of specific embodiments thereof, it will be understood in view of the instant disclosure that numerous variations upon the invention are now enabled to those skilled in the art, which variations yet reside within this scope of the instant teaching.

Thus, for example, it should be appreciated that the specific memory means heretofore described are merely exemplary of a number of memory means employable in the invention. Instead, e.g., of utilizing the SAM or FIFO memories heretofore discussed, the data proceeding in the receiver channel may be delayed by storage in a RAM (i.e., a random access memory). In such instance the input and output addresses of the stored data are clocked by read-in and read-out address counters so that the time between read-in and read-out of the data corresponds to the desired delay. The said read-in address counter may, therefore, as in the discussion of prior embodiments, be present with steering and focusing data from a ROM, whereby time of read-in is correlated with such preset data with the read-out addresses of all channels clocked simultaneously. The time between when a specific address is read in and that same address is read out is made to correspond to the required delay time of the signal data.

Accordingly, therefore, the invention is to be broadly construed and limited only by the scope and spirit of the claims now appended hereto.

I claim:

1. A real-time ultrasonic imaging system comprising:
an array of transducers adapted for propagating ultrasonic energy into a body to be ultrasonically examined and for receiving reradiated sonic energy from points within said body;
a plurality of signal channels respectively including transmitter branches and receiver branches, said transmitter branches activating said transducers to propagate said sonic energy, and said receiver branches receiving electrical signals from said transducers corresponding to said reradiated energy;
a plurality of identical digital memory means each respectively associated with one of said receiver branches, for receiving and storing data indicative of the signal level of said reradiated energy received by said receiver branch;
display means for receiving the data from the memory means in each of said channels, and for combining and processing said data to effect a display of the bodily portion being examined;
timing generator means in each signal channel connected to the transmitter branch and to the memory means associated with said channel, for activating said transducers at predetermined times of phase said transducers to enable steering and focusing of said array, and for activating said memory means and gating out the said data from said memory means at times which are delayed with respect to activation of the transducers by predetermined intervals, thereby controlling the bodily points from which said reradiated sonic energy is received in accordance with said delays, to thereby enable steering and focusing of said transducer array; and
control logic means connected to said timing generator means for enabling said signals to said memory means and said transmitter branches in each of said channels whereby said display of said bodily portion being examined is effected in real time.

2. Apparatus in accordance with claim 1 wherein said memory means comprises a serial analog memory connected to receive the analog signal in said receiver branch; and wherein said timing generator means comprises means for providing start-in and start-out pulses to said serial analog memory with a predetermined delay therebetween, to enable clocking in and clocking out of the receiver signal, with the said predetermined delay.

3. Apparatus in accordance with claim 2 wherein said timing generator means includes a ROM and preset counter means; means to load said preset counter means with data from said ROM in accordance with the desired activation time for said transmitter and the said predetermined delay between said start-in and start-out pulses; and means for activating at least one of said start-in or start-out signals upon the count in said preset counter reaching its preset value.

4. Apparatus in accordance with claim 1 wherein said receiver branch includes an ADC for digitizing the analog signal in said branch; said memory means comprising a FIFO digital memory for receiving the digitized data from said ADC; and wherein said timing generator means comprises means for providing start-in and start-out control signals to said FIFO, to enable said predetermined delay between clocking-in and clocking-out of the said digitized receiver signal.

5. Apparatus in accordance with claim 4 wherein said timing generator means includes a ROM and preset counter means; means to load said preset counter means with data from said ROM in accordance with the desired activation time for said transmitter and the said predetermined delay between said start-in and start-out pulses; and means for activating at least one of said start-in or start-out signals upon the count in said preset counter reaching its preset values.

6. Apparatus in accordance with claim 1, wherein said memory means comprises a random access memory.

7. Apparatus in accordance with claim 1, wherein said memory means comprises a charged coupled device (CCD) memory.

8. Apparatus in accordance with claim 7 wherein said timing generator means in each signal channel provides controlled clocking signals to said CCD memory whereby analog signals are stored in said CCD memory for a selected predetermined time period.

9. Apparatus in accordance with claim 1, in which each said channel is connected to a respective transducer of said array, both the transmitter branch and the receiver branch of said channel sharing said transducer.

10. Apparatus in accordance with claim 1, in which said array includes a plurality of transmitter transducers, and a like plurality of receiver transducers, and in which each of said transmitter branches is connected to a respective one of said transmitter transducers, and each of said receiver branches is connected to a respective one of said receiver transducers.

11. Apparatus in accordance with claim 7 wherein said timing generator means in each channel provides controlled clocking signals to said CCD memory at a plurality of different frequencies, each said frequency being provided a respectively separate time.

12. Apparatus in accordance with claim 11 wherein said clocking signals are provided to said CCD memory at two different frequencies sequentially.

13. Apparatus in accordance with claim 11 or 12, in which the total number of clocking signals to the CCD is the same for every channel.

14. Apparatus in accordance with claim 11 or 12, in which a given CCD receives the same number of clocking signals at each of said different frequencies.

15. A real-time ultrasonic imaging system comprising:
an array of transducers adapted for propagating ultrasonic energy into a body to be ultrasonically examined and for receiving reradiated sonic energy from points within said body;
a plurality of signal channels respectively including transmitter branches and receiver branches, said transmitter branches activating said transducers to propagate said sonic energy, and said receiver branches receiving electrical signals from said transducers corresponding to said reradiated energy;
a plurality of identical digital memory means, each including a serial analog memory and each respectively associated with one of said receiver branches, for receiving and storing data indicative of the signal level of said reradiated energy received by said receiver branch;
display means for receiving the data from the memory means in each of said channels, and for combining and processing said data to effect a display of the bodily portion being examined;
timing generator means in each signal channel connected to the transmitter branch and to the memory means associated with said channel, for activating said transducers at predetermined times to phase said transducers to enable steering and focusing of said array, and for activating said memory means and gating out the said data from said memory means at times which are delayed with respect to activation of the transducers by predetermined intervals, thereby controlling the bodily points from which said reradiated sonic energy is received in accordance with said delays, to thereby enable steering and focusing of said transducer array; and
control logic means connected to said timing generator means for enabling said signals to said memory means and said trasmitter branches in each of said channels whereby said display of said bodily portion being examined is effected in real time.

16. A real-time ultrasonic imaging system comprising:
an array of transducers adapted for propagating ultrasonic energy into a body to be ultrasonically examined and for receiving reradiated sonic energy from points within said body;
a plurality of signal channels respectively including transmitter branches and receiver branches, said transmitter branches activating said transducers to propagate said sonic energy and said receiver branches receiving electrical signals from said transducers corresponding to said reradiated energy;
a plurality of identical digital memory means, each including a FIFO memory and each respectively associated with one of said receiver branches, for receiving and storing data indicative of the signal level of said reradiated energy received by said receiver branch;
timing means for receiving the data from the memory means in each of said channels, and for combining and processing said data to effect a display of the bodily portion being examined;
timing generator means in each signal channel connected to the transmitter branch and to the memory means associated with said channel, for activating said transducers at predetermined times to phase said transducers to enable steering and focusing of said array, and for activating said memory means and gating out the said data from said memory means at times which are delayed with respect to activation of the transducers by predetermined intervals, thereby controlling the bodily points from which said reradiated sonic energy is received in accordance with said delays, to thereby enable steering and focusing of said transducer array; and
control logic means connected to said timing generator means for enabling said signals to said memory means and said transmitter branches in each of said channels whereby said display of said bodily portion being examined is effected in real time.

17. A real-time ultrasonic imaging system comprising:
an array of transducers adapted for propagating ultrasonic energy into a body to be ultrasonically examined and for receiving reradiated sonic energy from points within said body;
a plurality of signal channels respectively including transmitter branches and receiver branches, said transmitter branches activating said transducers to propagate said sonic energy, and said receiver branches receiving electrical signals from said transducers corresponding to said reradiated energy;
a plurality of digital memory means each including an identical charge-coupled device (CCD) and each respectively associated with one of said receiver branches, for receiving, time-sampling into plurality of sample bits, and storing data indicative of the signal level of said reradiated energy received by said receiver branch;

timing means for receiving the data from the memory means in each of said channels, and for combining and processing said data to effect a display of the bodily portion being examined;

timing generator means in each signal channel connected to the transmitter branch and to said CCD memory associated with said channel, for activating said transducers at predetermined times to phase said transducers to enable steering and focusing of said array, and for providing to said CCD controlled clocking pulses at a plurality of different frequencies sequentially, each sample bit within a given CCD being delayed similarly to every other bit therethrough, to gate out said data from said memory means at times which are delayed with respect to activation of the transducers by predetermined intervals, thereby controlling the bodily points from which said reradiated sonic energy is received in accordance with said delays, to thereby enable steering and focusing of said transducer array; and control logic means connected to said timing generator means for enabling said signals to said memory means and said transmitter branches in each of said channels whereby said display of said bodily portion being examined is effected in real time.

* * * * *